(12) United States Patent
Coan et al.

(10) Patent No.: US 9,414,130 B2
(45) Date of Patent: Aug. 9, 2016

(54) INTERACTIVE CONTENT OVERLAY

(71) Applicant: AT&T INTELLECTUAL PROPERTY I, L.P., Atlanta, GA (US)

(72) Inventors: William Coan, Monroe, WA (US); Xiaofeng Gao, Alpharetta, GA (US)

(73) Assignee: AT&T Intellectual Property, L.P., Atlanta, GA (US)

( * ) Notice: Subject to any disclaimer, the term of this patent is extended or adjusted under 35 U.S.C. 154(b) by 0 days.

(21) Appl. No.: 14/570,556

(22) Filed: Dec. 15, 2014

(65) Prior Publication Data

US 2016/0173961 A1    Jun. 16, 2016

(51) Int. Cl.
| | | |
|---|---|---|
| *H04N 7/025* | (2006.01) | |
| *H04N 21/858* | (2011.01) | |
| *H04N 21/435* | (2011.01) | |
| *H04N 21/4725* | (2011.01) | |
| *H04N 21/431* | (2011.01) | |
| *H04N 21/43* | (2011.01) | |
| *H04N 21/44* | (2011.01) | |

(52) U.S. Cl.
CPC ......... *H04N 21/8586* (2013.01); *H04N 21/435* (2013.01); *H04N 21/4307* (2013.01); *H04N 21/4316* (2013.01); *H04N 21/44016* (2013.01); *H04N 21/4725* (2013.01)

(58) Field of Classification Search
CPC . H04N 21/4307; H04N 21/43; H04N 21/431; H04N 21/4316; H04N 21/44; H04N 21/44016; H04N 21/4302; H04N 21/435; H04N 21/4825; H04N 21/4725
USPC ............................ 725/32, 42, 110, 112, 86, 34
See application file for complete search history.

(56) References Cited

U.S. PATENT DOCUMENTS

| | | |
|---|---|---|
| 6,698,020 B1 | 2/2004 | Zigmond et al. |
| 7,103,904 B1 | 9/2006 | Blackketter et al. |
| 8,051,442 B2 | 11/2011 | Ergen et al. |
| 8,533,753 B2 | 9/2013 | Briggs et al. |
| 8,782,690 B2 | 7/2014 | Briggs et al. |

(Continued)

FOREIGN PATENT DOCUMENTS

| | | |
|---|---|---|
| EP | 1983753 A1 | 10/2008 |
| WO | 2008016826 A2 | 2/2008 |

(Continued)

OTHER PUBLICATIONS

Goldfarb, A. et al., "Online display advertising: Targeting and obtrusiveness", Marketing Science, vol. 30, No. 3, May-Jun. 2011, pp. 389-404.

(Continued)

*Primary Examiner* — James R Sheleheda
(74) *Attorney, Agent, or Firm* — Toler Law Group, PC

(57) ABSTRACT

A media device includes a processor and a memory coupled to the processor. The memory stores instructions corresponding to an overlay application and a media playback application. The instructions are executable by the processor to perform various operations. The operations may include obtaining media content identified in a manifest and using the media playback application to generate a display that includes the media content. Responsive to a trigger in the manifest, the operations also include retrieving the overlay application from the memory and executing the overlay application to allocate a portion of the display to interactive content indicated by the manifest.

20 Claims, 5 Drawing Sheets

(56) References Cited

U.S. PATENT DOCUMENTS

| | | | |
|---|---|---|---|
| 8,863,175 B2 | 10/2014 | Waibel et al. | |
| 8,914,824 B2* | 12/2014 | Braun | G06Q 30/02 725/32 |
| 9,066,115 B1* | 6/2015 | Cherry | H04N 21/23424 |
| 9,066,138 B1* | 6/2015 | Kraiman | H04N 21/458 |
| 9,282,381 B2* | 3/2016 | Dhruv | H04N 21/6543 |
| 2002/0010928 A1 | 1/2002 | Sahota | |
| 2007/0157228 A1 | 7/2007 | Bayer et al. | |
| 2007/0300280 A1 | 12/2007 | Turner et al. | |
| 2008/0010117 A1* | 1/2008 | Oliveira | G06Q 30/02 705/26.1 |
| 2008/0111822 A1 | 5/2008 | Horowitz et al. | |
| 2008/0201736 A1 | 8/2008 | Gordon et al. | |
| 2008/0284910 A1 | 11/2008 | Erskine et al. | |
| 2009/0049090 A1* | 2/2009 | Shenfield | G06Q 30/02 |
| 2010/0175079 A1* | 7/2010 | Braun | G06Q 30/02 725/32 |
| 2011/0141359 A1 | 6/2011 | DiGiovanni et al. | |
| 2011/0145858 A1* | 6/2011 | Philpott | G06Q 30/02 725/32 |
| 2012/0042090 A1* | 2/2012 | Chen | H04L 65/607 709/231 |
| 2012/0047542 A1* | 2/2012 | Lewis | H04N 21/44016 725/97 |
| 2012/0198492 A1* | 8/2012 | Dhruv | H04N 21/23424 725/32 |
| 2012/0240151 A1 | 9/2012 | Tapper | |
| 2012/0297417 A1* | 11/2012 | Philpott | H04N 21/458 725/34 |
| 2012/0328263 A1 | 12/2012 | Barton et al. | |
| 2013/0086607 A1 | 4/2013 | Tom et al. | |
| 2013/0198773 A1 | 8/2013 | Jentz et al. | |
| 2013/0347032 A1 | 12/2013 | Geraci | |
| 2014/0040026 A1* | 2/2014 | Swaminathan | G06Q 30/02 705/14.53 |
| 2014/0189139 A1* | 7/2014 | Cheng | H04L 65/60 709/231 |
| 2015/0033023 A1* | 1/2015 | Xu | H04L 9/3247 713/176 |
| 2015/0172342 A1* | 6/2015 | Yin | H04L 65/4084 709/203 |
| 2015/0249869 A1* | 9/2015 | Dhruv | H04N 21/6543 725/32 |
| 2015/0325268 A1* | 11/2015 | Berger | G11B 27/19 386/248 |

FOREIGN PATENT DOCUMENTS

| | | |
|---|---|---|
| WO | 2010141172 A1 | 12/2010 |
| WO | 2012159359 A1 | 11/2012 |
| WO | 2013100931 A1 | 7/2013 |
| WO | 2014130213 A1 | 8/2014 |

OTHER PUBLICATIONS

Hua, X. et al., Abstract of "When multimedia advertising meets the new internet era", Multimedia Signal Processing, 2008, IEEE, Oct. 2008, 2 pages.

Lamdan, G., "7 Video Wishes That Just Came True with Celtra's Smart Video Ad Formats", Apr. 7, 2014, Retrieved from http://www.celtra.com/about/blog/?page=8, 5 pages.

Welch, M. et al., "Generating advertising keywords from video content", Proceedings of the 19th ACM international conference on Information and knowledge management, ACM, New York, NY, 2010, pp. 1421-1424.

* cited by examiner

INTERACTIVE CONTENT OVERLAY

FIELD OF THE DISCLOSURE

The present disclosure is generally related to interactive content.

BACKGROUND

Interactive advertisements may include graphics, text, or other interactive advertising content. In some cases, a text sequence ("trigger key") may be included in closed-captioning information (e.g., a Closed Caption 4 (CC4) stream) that is provided in conjunction with television content that is delivered to a device, such as a set-top box (STB) device. Multiple trigger keys may be pre-distributed to the STB device for comparison to the closed-captioning information. When the STB device detects a trigger key in a CC4 stream, the STB device may use the detected trigger key to identify interactive advertising content (content that is pre-stored at the STB device) to be displayed. However, the STB device may have a limited amount of space to store interactive advertising content. Further, the STB device may have limited resources (e.g., processing and memory resources) to concurrently detect triggering events.

DETAILED DESCRIPTION

Figure 1:
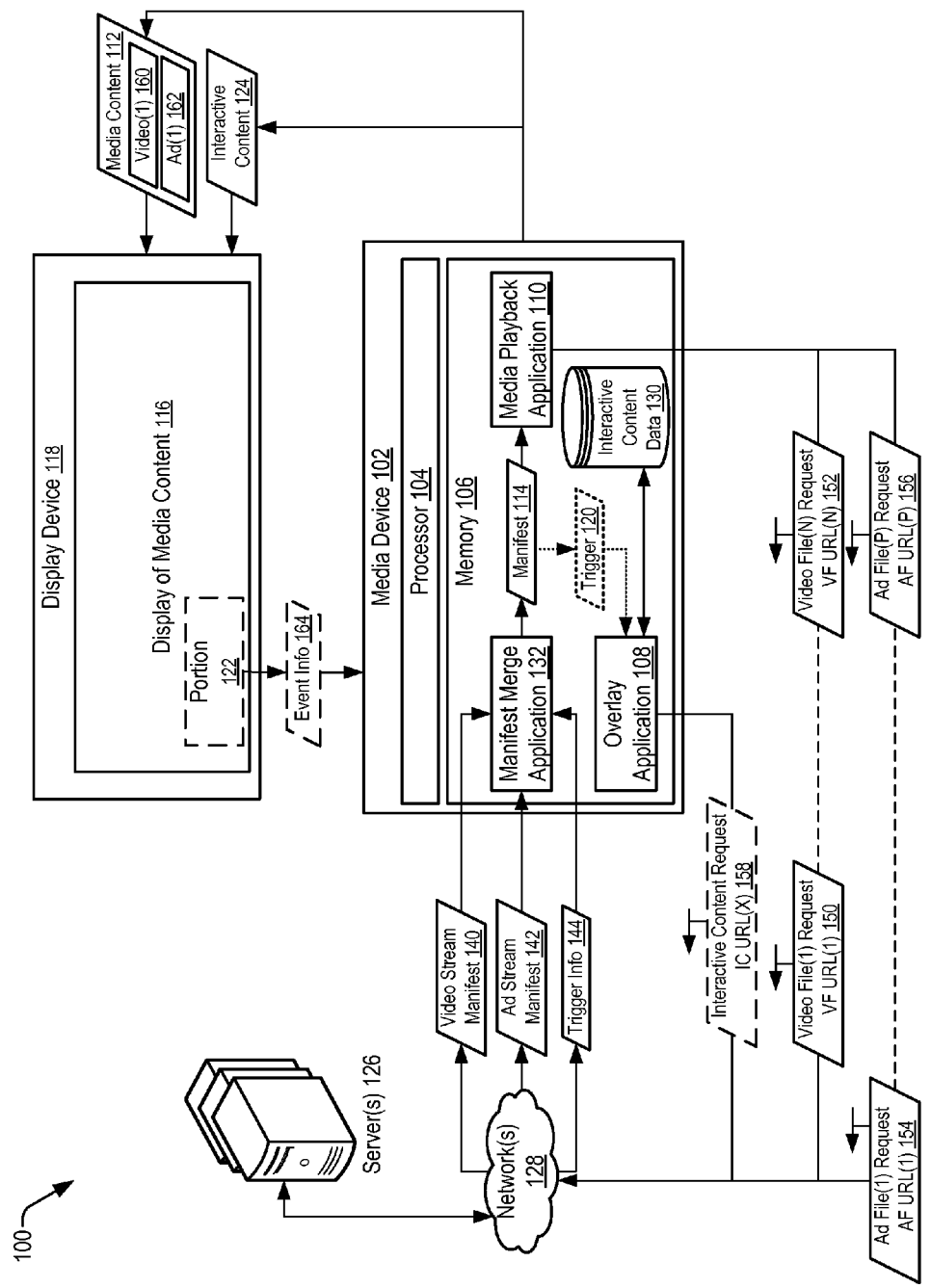
FIG. 1 is a diagram illustrating a particular embodiment of an interactive content overlay system.

The present disclosure describes systems and methods of overlaying interactive content (e.g., interactive advertisement content) onto media content. In some cases, a manifest that identifies a sequence in which multiple video files and advertisement files are to be displayed by a media device may include trigger(s) that identify particular file(s) as being associated with interactive content. In response to determining that a trigger is included in the manifest, the media device may retrieve an overlay application that is stored in a memory of the media device to determine interactive content (e.g., interactive advertisement content) to be displayed in conjunction with a particular file (e.g., an advertisement file).

The Hypertext Markup Language Version Five (HTML5) protocol is designed to include a number of features, such as native support for video content. Accordingly, the HTML5 protocol may allow a video service provider (e.g., a television service provider) to present video to a variety of different devices (e.g., televisions, smart phones, or computers) via a web browser. Video services may also utilize other protocols and/or standards, such as Adaptive Bit Rate (ABR) video delivery, to manage the video delivery process by matching network resources and device resources to appropriate delivery speeds.

In some cases, HTML5 and ABR video delivery methods may be utilized in order to eliminate the embedding of text strings in the CC4 stream and to limit an amount of interactive content that is pre-downloaded to the media device. Instead, trigger information may be embedded "in stream" (in band) and may trigger an overlay application at the media device to be retrieved from a memory of the media device. The ABR video delivery method changes the video delivery process from a broadcast method (a "push" to the media device) to an HTTP "get" method (a "pull" from the media device). With ABR video delivery, a video stream may be decomposed into a series of small files, and a list (or a "video stream manifest") of the files and their associated file locations may be created. The video stream manifest may contain a list of URLs that point to individual video files. Similarly, an advertisement stream may be decomposed into a series of small files, and a list (or an "advertisement stream manifest") of the files and their associated file locations may be created. The advertisement stream manifest may contain a list of URLs that point to individual advertisement files. The video stream manifest and the advertisement stream manifest may be merged into a "master" manifest (sequence) that includes trigger(s) that are inserted into the sequence to identify particular file(s) that are associated with interactive content.

In a particular embodiment, a media device includes a processor and a memory coupled to the processor. The memory stores instructions corresponding to an overlay application and a media playback application. The instructions are executable by the processor to perform various operations. The operations may include obtaining media content identified in a manifest and using the media playback application to generate a display that includes the media content. Responsive to a trigger in the manifest, the operations also include retrieving the overlay application from the memory (or via a network) and executing the overlay application to allocate a portion of the display to interactive content indicated by the manifest.

In another particular embodiment, a computer-readable storage device stores instructions corresponding to an overlay application and a media playback application. The instructions are executable to cause a processor of a device to perform operations. The operations include obtaining media content identified in a manifest. The manifest identifies a plurality of files associated with a media content stream and a sequence in which individual files of the plurality of files are to be displayed. The operations include using the media playback application to generate a display that includes the media content. Responsive to a trigger in the manifest that identifies a particular file, the operations include using the overlay application to retrieve interactive content that is to be displayed in conjunction with the particular file. The operations further include using the overlay application to allocate a portion of the display to the interactive content.

In another particular embodiment, a method includes determining, at a media device, media content to be obtained based on a manifest. The manifest identifies a plurality of video files and a first set of network locations associated with the video files. The manifest also identifies a plurality of advertisement files and a second set of network locations associated with the advertisement files. The manifest further identifies a sequence in which individual video files and individual advertisement files are to be displayed. The method also includes retrieving instructions corresponding to a media playback application from a memory of the media device and using the media playback application to generate a display that includes the media content. In response to a trigger that identifies a particular advertisement file in the manifest that is associated with a particular advertisement, the method includes retrieving interactive advertisement content associated with the particular advertisement. The method further includes retrieving instructions corresponding to an overlay application from the memory of the media device and using the overlay application to overlay the interactive advertisement onto the particular advertisement.

Referring to FIG. 1, a particular embodiment of an interactive content display system is illustrated and generally designated 100. FIG. 1 illustrates that a media device 102 (e.g., a set-top box device, a tablet computing device, a "smart" phone, or a "smart" television) may determine whether to overlay interactive content onto media content based on whether a manifest includes a trigger that identifies a particular file (e.g., a video file or an advertisement file) as being associated with interactive content.

In the particular embodiment illustrated in FIG. 1, the media device 102 includes a processor 104 and a memory 106 that is accessible to the processor 106. The memory 106 stores instructions corresponding to an overlay application 108 and a media playback application 110. The media device 102 is configured to determine media content 112 to be obtained based on the manifest 114, to retrieve the media content 112 identified in the manifest 114, and to use the media playback application 110 to generate a display 116 of the media content 114 (at a display device 118 that is communicatively coupled to, or part of, the media device 102). In some cases, as described further herein, the media device 102 may generate the manifest 114 based on information that identifies an order in which particular media content items (e.g., video content and advertisement content) are to be presented and based on trigger information that identifies particular media content item(s) that are associated with interactive content (to be overlaid onto a particular media content item in response to detecting a particular trigger in the manifest 114). In the embodiment illustrated in FIG. 1, the media device 102 and the display device 118 are illustrated as separate devices for illustrative purposes only. In alternative embodiments (e.g., when the media device 102 corresponds to a tablet computing device, a "smart" phone, or a "smart" television), the display device 118 may be incorporated into the media device 102. In some cases, the overlay application 108 may overlay interactive advertisement content onto a particular advertisement for display via a web browser.

In response to a trigger 120 in the manifest 114, the media device 102 is configured to retrieve the overlay application 108 from the memory 106 and to execute the overlay application 108 (using the processor 104). As described further herein with respect to FIG. 2, the trigger 120 may identify a particular file in the manifest 114 (e.g., an advertisement file) that is associated with interactive content (e.g., interactive advertisement content to be displayed in conjunction with an advertisement associated with the advertisement file). In response to the trigger 120, the media device 102 is configured to use the overlay application 108 to allocate (e.g., to map) a portion 122 of the display 116 (of the media content 112) to interactive content (e.g., an event handler) indicated by the manifest 114. For example, as described further herein with respect to FIG. 3, the event handler indicated by the manifest 114 may be used to determine one or more operations to be performed at the media device 102 responsive to a user selection of a particular selectable option that is displayed in conjunction with a media content item (e.g., an advertisement). As illustrative, non-limiting examples, the media device 102 may be configured to determine information to be sent to a server 126 (or multiple servers) via a network 128 (or multiple networks) responsive to an event corresponding to a user selection of a "like" option, a user selection of a "buy" option, or a user selection of a "more information" option, among other alternatives.

In some cases, the overlay application 108 may be configured to retrieve interactive content 124 to be displayed in conjunction with the media content 112 from the server 126 via the network 128 responsive to detecting the trigger 120 in the manifest 114. As further described herein with respect to FIG. 2, the trigger 120 may indicate that a particular advertisement file identified in the manifest 114 is associated with interactive advertisement content, and the manifest 114 may identify a network address associated with the interactive advertisement content. In this example, the media device 102 may retrieve the overlay application 108 from the memory 102 (responsive to the trigger 120), and the overlay application 108 may retrieve the interactive advertisement content from the server 126 based on the network address identified in the manifest 114. In an alternative embodiment, FIG. 1 illustrates that the media device 102 may be configured to receive one or more interactive content items (e.g., interactive advertisement content items) and to store the interactive content item(s) in the memory 106 as interactive content data 130. In this case, the overlay application 108 may be configured to retrieve the interactive content 124 to be displayed in conjunction with the media content 112 from the interactive content data 130 stored in the memory 106 responsive to the trigger 120 in the manifest 114.

In the particular embodiment illustrated in FIG. 1, the memory 106 of the media device 102 stores instructions corresponding to a manifest merge application 132. The manifest merge application 132 may be configured to generate the manifest 114 (e.g., a "master" manifest) based on information received from the server 126 (or multiple servers) via the network 128 (or multiple networks) in order to determine a sequence in which individual media content items are to be displayed at the display device 118. In the example illustrated in FIG. 1, the manifest merge application 132 may generate the manifest 114 based on a video stream manifest 140, an advertisement stream manifest 142, and trigger information 144. The video stream manifest 140, the advertisement stream manifest 142, and the trigger information 144 may be received from server(s) 126 associated with a single content provider or may be received from server(s) 126 associated with multiple content providers. As an illustrative non-limiting example, a video content provider may generate the video stream manifest 140, and an advertisement content provider may generate the advertisement stream manifest 142 and the trigger information 144. The content provider(s) may send the video stream manifest 140, the advertisement stream manifest 142, and the trigger information 144 from the server(s) 126 to the media device 102 via the network 128.

In a particular embodiment, the advertisement stream manifest 142 may be received and stored in the memory 106 of the media device 102 prior to receipt of the video stream manifest 140. As described further herein with respect to FIG. 2, the video stream manifest 140 may identify a plurality of video files associated with a video stream, a first set of network locations associated with the video files, and a plurality of advertisement markers that identify multiple locations in the video stream for insertion of advertisements. The advertisement stream manifest 142 may identify a plurality of advertisement files and a second set of network locations associated with the advertisement files. The trigger information 144 may identify a particular file (or multiple files) associated with the interactive content 124 (e.g., one or more advertisement files associated with interactive advertisement content). The manifest merge application 132 may generate the manifest 114 by merging the video stream manifest 140 and the advertisement stream manifest 142. The manifest 114 may identify a sequence in which individual video files (identified in the video stream manifest 140) and individual advertisement files (identified in the advertisement stream manifest 142) are to be displayed.

In a particular embodiment, the first set of network locations associated with the video files (identified in the video stream manifest 140) may include a first set of Uniform Resource Locators (URLs), and the second set of network locations associated with the advertisement files (identified in the advertisement stream manifest 142) may include a second set of URLs. As described further herein with respect to FIG. 2, the media playback application 110 of the media device 102 may be configured to retrieve the video files and the advertisement files based on the sequence identified by the manifest 114. Thus, rather than content provider(s) sending content to the media device 102 ("pushing" content to the media device 102), the media device 102 may retrieve content associated with the individual files ("pulling" the content) based on the sequence identified by the manifest 114. For example, the HTML5 protocol provides native support for video playback, and the media playback application 110 may be configured to generate requests to retrieve the video files from the first set of URLs in accordance with the HTML5 protocol based on the sequence identified in the manifest 114. The media playback application 110 may be further configured to generate requests to retrieve the advertisement files from the second set of URLs in accordance with the HTML5 protocol based on the sequence identified in the manifest 114.

Figure 2:
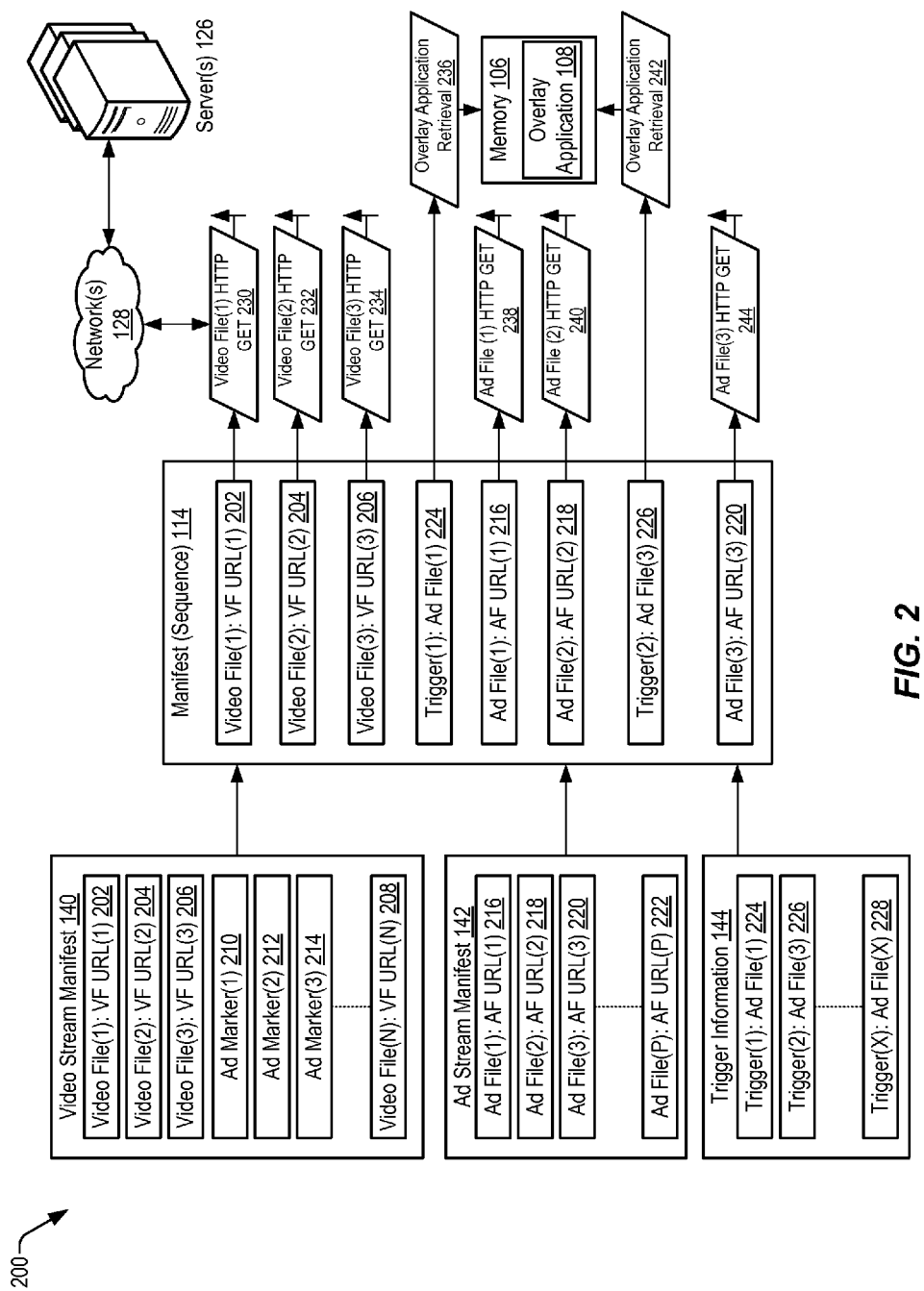
FIG. 2 is a diagram illustrating an example of merging multiple manifests to generate a manifest (e.g., a "master" manifest) and performing operations based on information included in the manifest.

In operation, the manifest merge application 132 generates the manifest 114 based on the video stream manifest 140, the advertisement stream manifest 142, and the trigger information 144 (as described further herein with respect to FIG. 2). For example, a user at the media device 102 may request a particular media content stream (e.g., a "channel" in the context of television content), and the media device 102 may send a request to content provider(s) associated with the particular media content stream. In some cases, the content provider(s) may respond to the request for the particular media content stream by sending at least the video stream manifest 140 to the media device 102. In a particular embodiment, the media device 102 may receive the advertisement stream manifest 142 and may store the advertisement stream manifest 142 in the memory 106 prior to receipt of the video stream manifest 140. In this case, the manifest merge application 132 may retrieve the advertisement stream manifest 142 from the memory 106 to generate the manifest 114. Alternatively, the content provider(s) may send the advertisement stream manifest 142 responsive to the request from the media device 102 for the particular media content stream. The media device 102 may determine media content items to be obtained (e.g., via the network 128) based on the manifest 114. For example, the manifest 114 may identify a sequence in which individual files of a plurality of files associated with a multimedia content stream are to be displayed, and the media device 102 may generate requests to retrieve the files based on the sequence identified in the manifest 114.

In a particular embodiment, the media device 102 may generate separate requests (HTTP "get" requests) for each of the video files and advertisement files from different URLs in accordance with the HTML5 protocol based on the sequence identified in the manifest 114. The individual video files represent "chunks" of video content to be presented at the display device 118 based on the sequence identified in the manifest 114, and the individual advertisement files represent "chunks" of advertisement content to be presented at the display device 118 based on the sequence identified in the manifest 114. The trigger information 144 may identify one or more of the video files and/or one or more of the advertisement files associated with interactive content. In some cases, the interactive content may be retrieved from one or more URLs in accordance with the HTML5 protocol. In other cases, the interactive content or a portion thereof may be stored locally in the memory 106 of the media device 102 (as the interactive content data 130) and may be retrieved from the memory 106 (rather than sending requests for interactive content via the network 128).

FIG. 1 illustrates that the media device 102 may request a plurality of video files, a plurality of advertisement files, and (optionally) one or more interactive content items based on the sequence identified in the manifest 114. In the example of FIG. 1, the video file requests include a first video file (VF) request 150 through an Nth video file (VF) request 152, the advertisement file requests include a first advertisement file (AF) request 154 through a Pth advertisement file (AF) request 156, and the interactive content request(s) may include an interactive content (IC) request 158. To illustrate, a first network location (e.g., URL 1) may be associated with the first video file request 150, an Nth network location (e.g., URL N) may be associated with the Nth video file request 152. The media playback application 110 may generate Hypertext Transfer Protocol (HTTP) "get" requests for the video files (e.g., video files 1 to N) from the individual video file URLs (e.g., VF URLs 1 through N) in accordance with the HTML5 protocol. As another example, a first network location (e.g., URL 1) may be associated with the first advertisement file request 154, and a Pth advertisement file network location (e.g., AF URL P) may be associated with the Pth advertisement file request 156. The media playback application 110 may generate HTTP "get" requests for the advertisement files (e.g., advertisements files 1 to P) from the individual URLs (e.g., URLs 1 through P) in accordance with the HTML5 protocol. As a further example, a first network location (e.g., URL X) may be associated with the interactive content request 158, and the media playback application 110 may generate an HTTP "get" request for the interactive content from the particular interactive content URL (e.g., IC URL X) in accordance with the HTML5 protocol.

The media playback application 110 may provide the media content 112 to the display device 118 based on the sequence identified in the manifest 114. For example, FIG. 1 illustrates that the media content 112 may include video content corresponding to a particular video file (e.g., a first video file 160) or advertisement content corresponding to a particular advertisement file (e.g., a first advertisement file 162) depending on the sequence identified in the manifest 114. In some cases, the trigger 120 may identify a particular advertisement file (e.g., the first advertisement file 162) as a file associated with interactive advertisement content. In other cases, the trigger 120 may identify a particular video file (e.g., the first video file 160) as a file associated with interactive content. FIG. 1 illustrates that, when the trigger 120 identifies a particular file, the media device 102 may retrieve the overlay application 108 from the memory 106, execute the overlay application 108, and use the overlay application 108 to map the portion 122 of the display 116 (e.g., a range of pixel values, a touchscreen input area, etc.) to an event handler indicated by the manifest 114.

As an illustrative non-limiting example, when the trigger 120 identifies the first advertisement file 162, the overlay application 108 may retrieve the interactive content 124 (e.g., interactive advertisement content). FIG. 1 illustrates that the overlay application 108 may retrieve the interactive content 124 from the server 126 based on a network address (e.g., URL X) identified in the manifest 114. Alternatively, the overlay application 108 may retrieve the interactive content 124 from the interactive content data 130 stored in the memory 106. FIG. 1 further illustrates that the overlay application 108 may overlay the interactive content 124 onto the portion 122 of the display 116.

Figure 3:
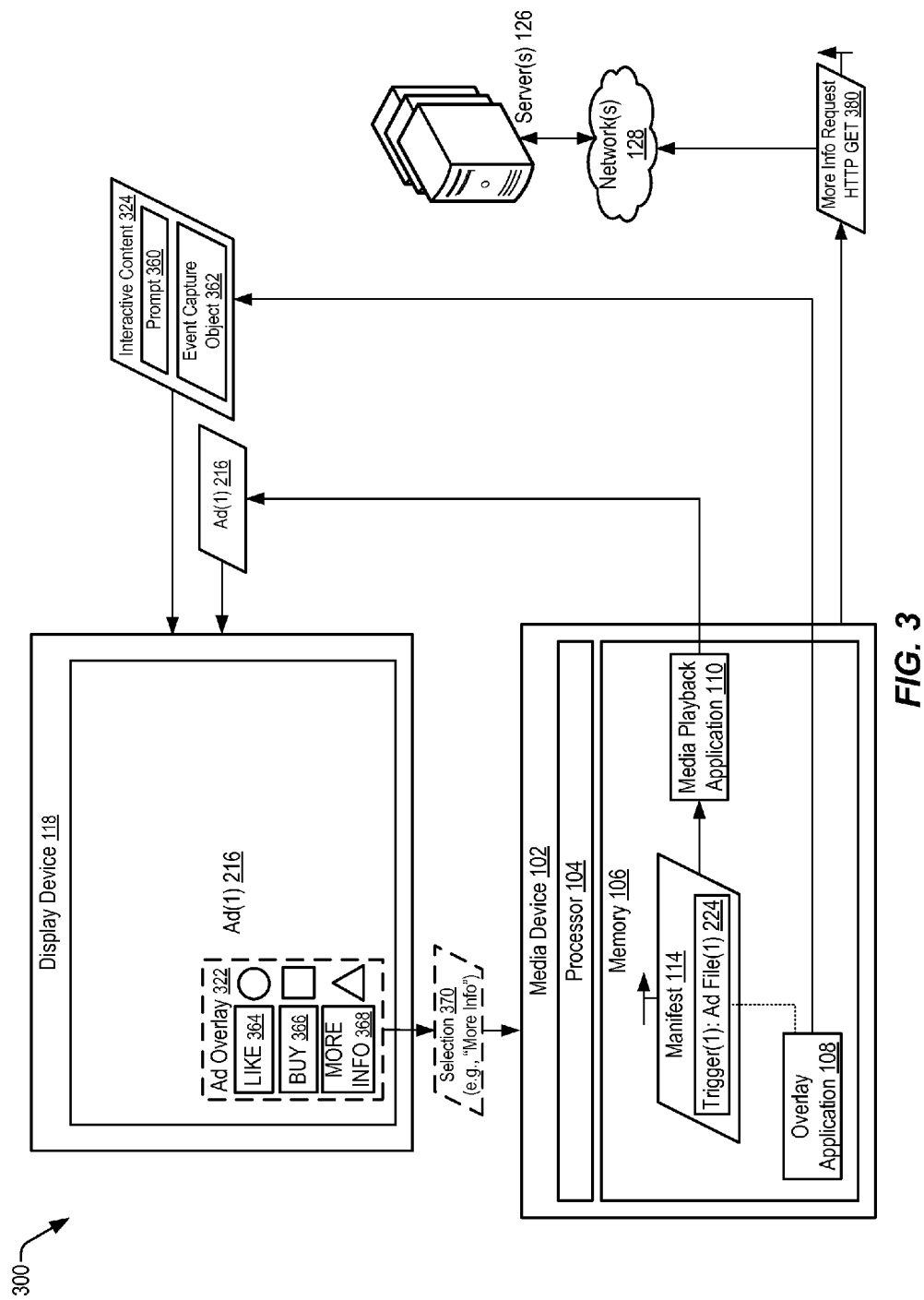
FIG. 3 is a diagram illustrating another particular embodiment of an interactive content overlay system.

As described further herein with respect to FIG. 3, the interactive content 124 may include one or more selectable options associated with a particular media content item (e.g., the first advertisement file 162). Illustrative, non-limiting examples of selectable options may include a "like" option to like a product associated with a particular advertisement, a "buy" option to buy a product associated with a particular advertisement, or a "more information" option to request more information for a product associated with a particular advertisement, among other alternatives. User interaction with the interactive content 124 may be provided to the media device 102 as event information 164. As an example, when advertisement content corresponding to the first advertisement file 162 is displayed at the display device 118, the event information 164 may include information associated with a user selection (e.g., via a remote control device or a touch-screen display) of a particular selectable option (e.g., a "like" option, a "buy" option, or a "more information" option). As another example, when video content corresponding to the first video file 160 is displayed at the display device 118, the event information 164 may include information associated with a user selection (e.g., via a remote control device or a touchscreen display) of a particular answer to a poll question, an option to rate a particular program, or an option to add a particular program to a list of programs to be recorded via a digital video recorder, among other alternatives.

Thus, FIG. 1 illustrates that the media device 102 (e.g., a set-top box device, a tablet computing device, a "smart" phone, or a "smart" television) may determine whether to overlay particular interactive content (e.g., the interactive content 124) onto particular media content (e.g., the media content 112) based on whether a manifest (e.g., the manifest 114) includes a trigger (e.g., the trigger 120) associated with a particular video file or advertisement file. Examples of interactive content include user selectable options to perform one or more actions with respect to particular advertisement content (e.g., to "like" a product, to buy a product, or to request additional information for a product) or to perform one or more actions with respect to particular video content (e.g., to answer a poll question, to rate a program, or to add a program to a list of programs for recording). In cases where the media device 102 "pulls" content based on a sequence in a manifest (e.g., utilizing the native support for video in the HTML5 protocol), the CC4 stream may not be available to a content provider. FIG. 1 illustrates an example in which the trigger 120 in the manifest 114 may allow the content provider to identify particular media content that is associated with interactive content. The trigger 120 provides an indication to the media device 102 that the overlay application 108 is to be retrieved from the memory 106 and used to overlay the interactive content 124 onto particular media content.

FIG. 2 is a diagram 200 that illustrates an example process of generating the manifest 114 (e.g., a "master" manifest) and performing file retrieval operations and overlay application retrieval operations based on the sequence identified in the manifest 114. FIG. 2 illustrates that a media device (e.g., the media device 102 of FIG. 1) may generate the manifest 114 based on the video stream manifest 140, the advertisement stream manifest 142, and the trigger information 144. FIG. 2 further illustrates that the trigger information 144 may identify particular file(s) in the manifest 114 that are associated with interactive content, and an overlay application (e.g., the overlay application 108 of FIG. 1) may be retrieved to determine the interactive content to be displayed in conjunction with the particular file(s). To illustrate, an advertising agency and/or a media provider may provide a schedule of advertisements and may provide information regarding interactive advertisement content to be associated with particular advertisements in the schedule. In some cases, the information from the advertising agency and/or the media provider may include the trigger information 144. In other cases, the trigger information 144 may be generated based on the schedule of advertisements and the particular advertisements in the schedule that are associated with interactive advertisement content.

In the particular embodiment illustrated in FIG. 2, the video stream manifest 140 includes a plurality of video files and multiple advertisement markers. In other embodiments, the video stream manifest 140 may include an alternative number of video files, an alternative number of advertisement markers, an alternative sequence of files and/or markers, or a combination thereof. In the example of FIG. 2, the plurality of video files identified in the video stream manifest 140 includes a first video file 202, a second video file 204, a third video file 206, and an Nth video file 208. The advertisement markers identified in the video stream manifest 140 includes a first advertisement marker 210, a second advertisement marker 212, and a third advertisement marker 214. FIG. 2 further illustrates that the first video file 202 may be associated with a first URL, the second video file 204 may be associated with a second URL, the third video file 206 may be associated with a third URL, and the Nth video file 208 may be associated with an Nth URL.

In the particular embodiment illustrated in FIG. 2, the advertisement stream manifest 142 identifies a first advertisement file 216, a second advertisement file 218, a third advertisement file 220, and a Pth advertisement file 222. In other embodiments, the advertisement stream manifest 142 may include an alternative number of advertisement files. FIG. 2 further illustrates that the first advertisement file 216 may be associated with a first URL, the second advertisement file 218 may be associated with a second URL, the third advertisement file 220 may be associated with a third URL, and the Pth advertisement file 222 may be associated with a Pth URL.

In the particular embodiment illustrated in FIG. 2, the trigger information 144 includes information associated with a first trigger 224, information associated with a second trigger 226, and information associated with an Xth trigger 228. In the example of FIG. 2, the first trigger 224 may identify the first advertisement file 216 as being associated with interactive content, and the second trigger 226 may identify the second advertisement file 218 as being associated with interactive content. As an illustrative, non-limiting example, the triggers 224 and 226 may include a first portion that includes trigger criteria (e.g., to launch interactive content three seconds after initiating playback of a particular advertisement file) and a second portion that identifies an action associated with the particular trigger (e.g., to execute particular code when the trigger criteria is satisfied). To illustrate, the code may reference an HTML page including text, video, and/or graphics as well as selectable indicators (e.g., "buttons"). The video and/or graphics may be referenced by URLs.

FIG. 2 illustrates that the manifest 114 generated by merging the video stream manifest 140 and the advertisement stream manifest 142 (along with the trigger information 144 that identifies particular files as being associated with interactive content) may allow a media device (e.g., the media device 102 of FIG. 1) to generate HTTP "get" requests based on URLs associated with individual video and advertisement files and to retrieve interactive content responsive to a particular trigger in the sequence. To illustrate, responsive to a user request for a particular media content stream, the media device 102 may request the first video file 202 identified in the manifest 114 by sending a first HTTP get request 230 (to a first URL), may request the second video file 204 identified in the manifest 114 by sending a second HTTP get request 232 (to a second URL), and may request the third video file 206 identified in the manifest 114 by sending a third HTTP get request 234 (to a third URL). In the example manifest 114 of FIG. 2, the first trigger 224 identifies a next file to be retrieved (e.g., the first advertisement file 216) as being associated with interactive advertisement content. In this case, a first overlay application retrieval operation 236 may be associated with the media device 102 retrieving the overlay application 108 from the memory 106 responsive to the first trigger 224. For example, the overlay application 108 may retrieve first application code and/or a first set of HTML page(s) identified by the first trigger 224.

FIG. 2 further illustrates that the media device 102 may request the first advertisement file 216 identified in the manifest 114 by sending a first HTTP get request 238 and may request the second advertisement file 218 identified in the manifest 114 by sending a second HTTP get request 240. In the example manifest 114 of FIG. 2, the second trigger 226 identifies a next file to be retrieved (e.g., the third advertisement file 220) as being associated with interactive advertisement content. In this case, a second overlay application retrieval operation 242 may be associated with the media device 102 retrieving the overlay application 108 from the memory 106 responsive to the second trigger 226. For example, the overlay application 108 may retrieve second application code and/or a second set of HTML page(s) identified by the second trigger 226. FIG. 2 also illustrates that the media device 102 may request the third advertisement file 220 identified in the manifest 114 by sending a third HTTP get request 244.

Thus, FIG. 2 illustrates that the manifest 114 may represent an interlaced sequence of URLs to be retrieved by the media device 102 via multiple HTTP get requests (e.g., utilizing the native support for video playback associated with the HTML5 protocol). In the context of media playback based on the media device 102 "pulling" content using HTTP get requests, rather than using a CC4 stream, a content provider may utilize the manifest 114 to provide a signal to the media device 102 to indicate that interactive content is to be displayed. Further, the trigger information 144 may be interlaced into the manifest 114 in order to identify particular file(s) in the sequence that are associated with interactive content. In response to identifying a trigger in the manifest 114, the media device 102 may retrieve the overlay application 108 from the memory 106 and determine the particular interactive content to be displayed in conjunction with display of media content associated with the identified file.

Referring to FIG. 3, a particular embodiment of an interactive content overlay system is illustrated and generally designated 300. In FIG. 3, interactive advertisement content may be associated with a particular advertisement file, and the media device 102 may determine operation(s) to be performed responsive to user selection of a particular option in the interactive advertisement content.

In the particular embodiment illustrated in FIG. 3, the media device 102 may determine that interactive content 324 is associated with a particular advertisement file (e.g., the first advertisement file 216) based on the first trigger 224 included in the manifest 114. In response to identifying the first trigger 224, the media device 102 may retrieve the overlay application 108 from the memory 106, execute the overlay application 108, and use the overlay application 108 to map a portion 322 (e.g., an advertisement overlay portion) of a display of media content (e.g., a display of the first advertisement 216) to an event handler indicated by the manifest 114.

In the example of FIG. 3, the event handler indicated by the manifest 114 may be used to determine one or more operations to be performed at the media device 102 responsive to a user selection of a particular selectable option that is displayed in conjunction with the first advertisement 216. As illustrative, non-limiting examples, the media device 102 may be configured to determine information to be sent to the server 126 (or multiple servers) via the network 128 (or multiple networks) responsive to an event corresponding to a user selection of a first selectable option 364 (e.g., a "like" option), a user selection of a second selectable option 366 (e.g., a "buy" option), or a user selection of a third selectable option 368 (e.g., a "more information" option). In alternative embodiments, an alternative number and/or arrangement of selectable options may be displayed. In the example of FIG. 3, the user may select the third selectable option 368 (e.g., the "more information" option), and the media device 102 may generate an HTTP get request 380 responsive to the selection. In the example of a request for more information associated with a particular product identified in the first advertisement 216, the HTTP get request 380 may represent a request to retrieve more information associated with the particular product.

In a particular embodiment, a user may use a remote control device (not shown) to select a particular option. Alternatively, the user may select a particular option via another input device (e.g., a touchscreen in the case where the media device 102 is a tablet computing device, among other alternatives). In the example of FIG. 3, the first selectable option 364 is associated with a circle icon, and a corresponding selectable circle-shaped control (e.g., a circular-shaped button) on the remote control device may selected by the user in order to select the first selectable option 364. As another example, FIG. 3 illustrates that the second selectable option 366 is associated with a square icon, and a corresponding selectable square-shaped control (e.g., a square-shaped button) on the remote control device may selected by the user in order to select the second selectable option 366. As a further example, FIG. 3 illustrates that the third selectable option 368 is associated with a triangle icon, and a corresponding selectable triangular-shaped control (e.g., a triangular-shaped button) on the remote control device may selected by the user in order to select the third selectable option 368.

Thus, FIG. 3 illustrates an example of an overlay of interactive advertisement content onto a particular advertisement associated with an advertisement file (e.g., the first advertisement file 216) in response to a trigger (e.g., the first trigger 224). FIG. 3 further illustrates that the media device 102 may determine operation(s) to be performed responsive to user selection of a particular option (e.g., a user selection of the third selectable option 368) in the interactive advertisement content.

Figure 4:
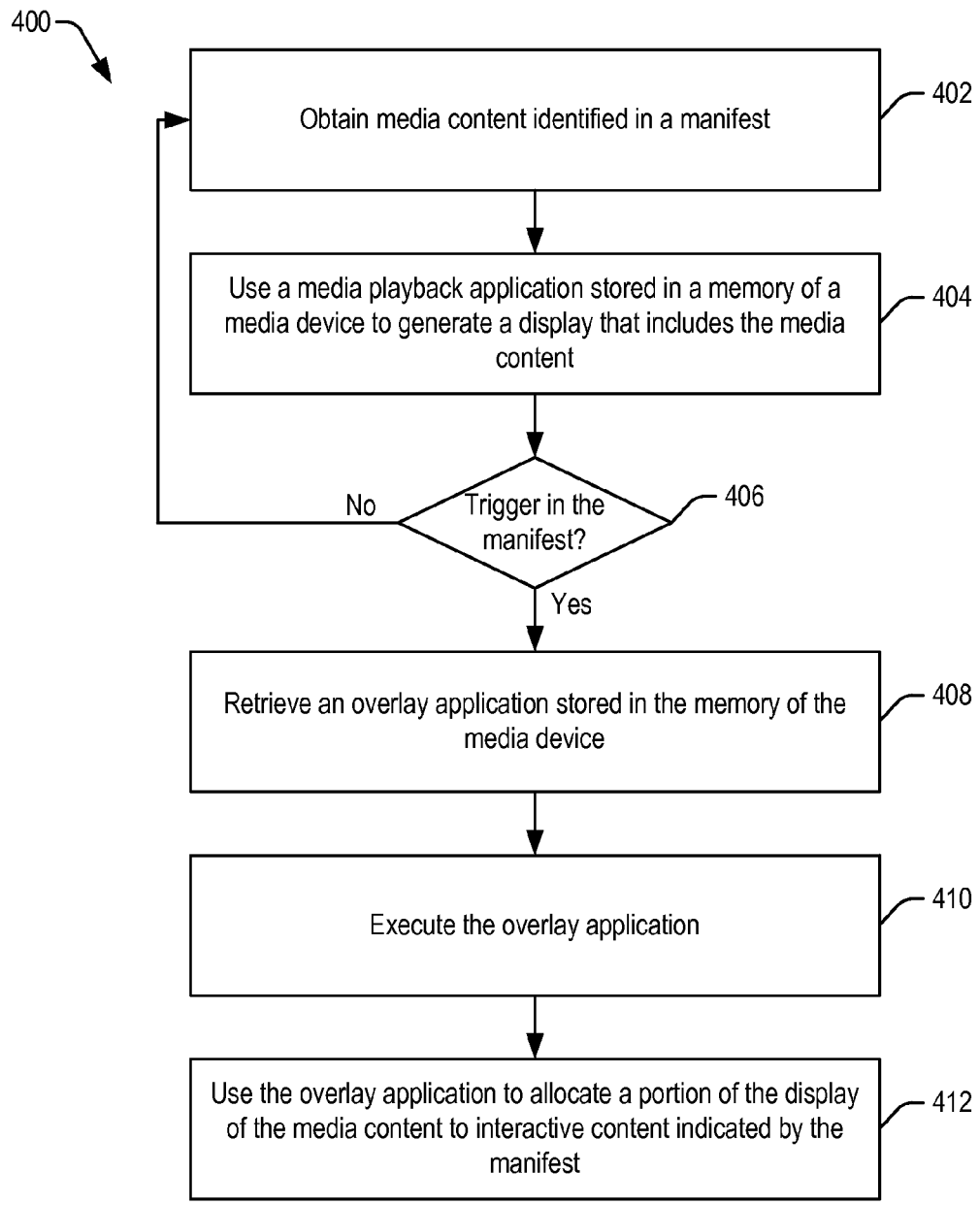
FIG. 4 is a flow diagram that illustrates a particular embodiment of a method for overlaying interactive content.

FIG. 4 illustrates a particular embodiment of a method 400 for overlaying interactive content responsive to a trigger in a manifest that identifies a sequence of media content items to be displayed. In FIG. 4, when a trigger identifies a particular file in the sequence of media content items as being associated with interactive content, an overlay application may be retrieved from a memory of a media device.

The method 400 includes obtaining media content identified in a manifest, at 402. For example, referring to FIG. 1, the media device 102 may obtain the media content 112 identified in the manifest 114 by sending requests (e.g., HTTP get requests) to one or servers 126 based on a sequence of video files and advertisement files to be displayed at the display device 118. To illustrate, the media device 102 may send the first request 150 for the first video file identified in the manifest 114 to a first URL, and the media device 102 may send the Nth request 152 for the Nth video file identified in the manifest 114 to an Nth URL. As another example, the media device 102 may send the first request 154 for the first advertisement file identified in the manifest 114 to a first URL identified in the manifest 114, and the media device 102 may send the Pth request 156 for the Pth advertisement file identified in the manifest 114 to a Pth URL identified in the manifest 114.

The method 400 includes using a media playback application stored in a memory of a media device to generate a display that includes the media content, at 404. For example, referring to FIG. 1, the media device 102 may use the media playback application 110 stored in the memory 106 to generate the display 116 that includes the media content 112.

The method 400 includes determining whether a trigger is included in the manifest, at 406. For example, referring to FIG. 1, the media device 102 may determine whether the trigger 120 is included in the manifest 114. In response to determining that a trigger is not included in the manifest, the method 400 may return to 402 to continue obtaining media content identified in the manifest (e.g., next video file or a next advertisement file). For example, referring to FIG. 1, the media device 102 may continue to send request(s) for video file(s) and/or advertisement file(s) identified in the manifest 114 when the trigger 120 is not identified in the sequence of files identified by the manifest 114.

In response to determining that the trigger is included in the manifest, the method 400 includes retrieving an overlay application stored in the memory of the media device, at 408. The method 400 further includes executing the overlay application, at 410. For example, referring to FIG. 1, the media device 102 may retrieve the overlay application 108 stored in the memory 106 of the media device 102 and may execute the overlay application 108.

The method 400 also includes using the overlay application to allocate a portion of the display of the media content to interactive content indicated by the manifest, at 412. For example, referring to FIG. 1, the media device 102 may use the overlay application 108 to allocate the portion 122 of the display 116 to the interactive content 124 indicated by the manifest 114.

Figure 5:
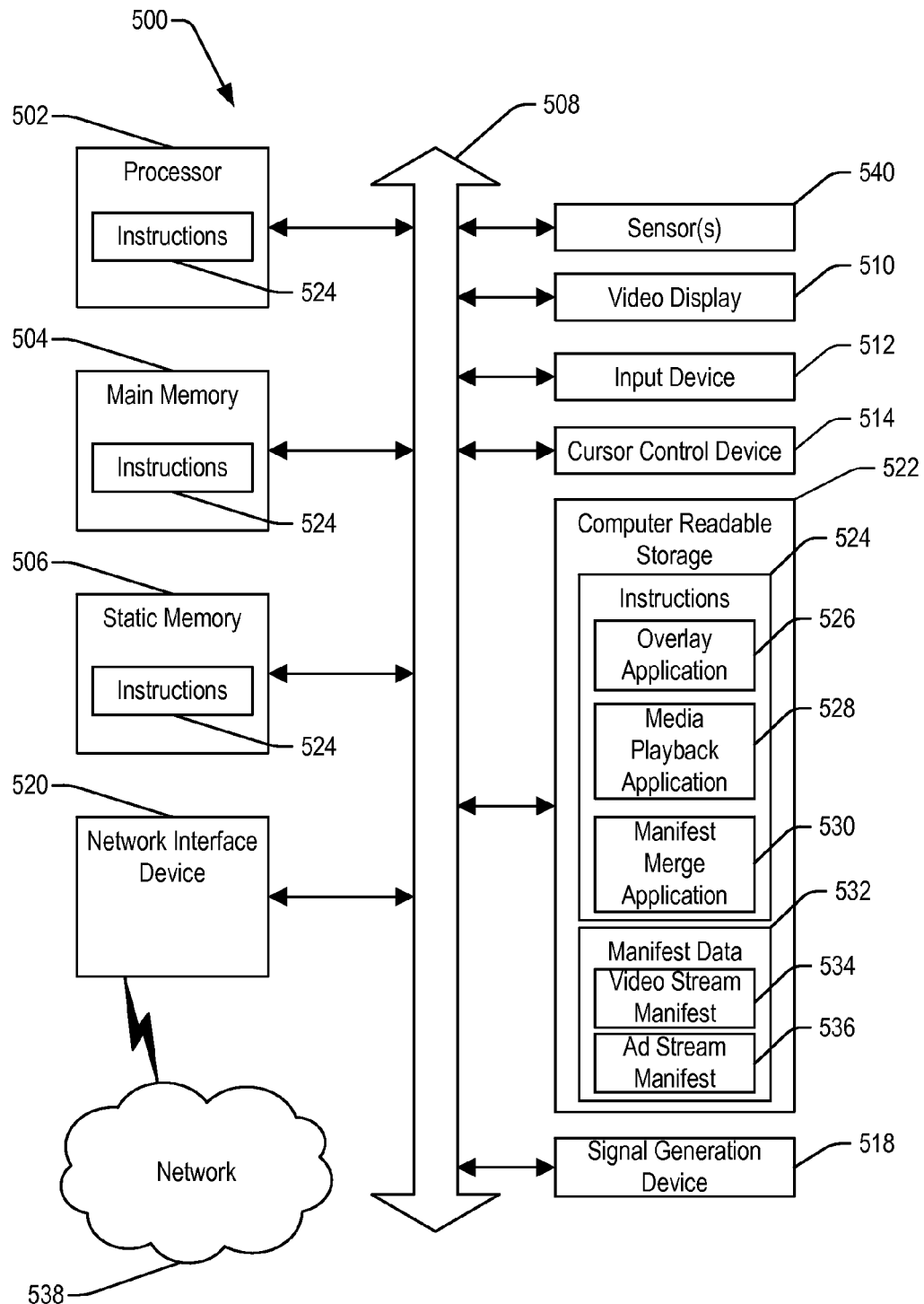
FIG. 5 is a block diagram of an illustrative embodiment of a general computer system.

Referring to FIG. 5, an illustrative embodiment of a general computer system is shown and is designated 500. The computer system 500 includes a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the computer system 500 may include or be included within any one or more of the media device 102, the server(s) 126, or combinations thereof described with reference to FIGS. 1-3.

In a networked deployment, the computer system 500 may operate in the capacity of a server or as a client user computer in a server-client user network environment, or as a peer computer system in a peer-to-peer (or distributed) network environment. The computer system 500 may also be implemented as or incorporated into various devices, such as a mobile device, a palmtop computer, a laptop computer, a desktop computer, a communications device, a wireless telephone, a personal computer (PC), a tablet PC, a personal digital assistant (PDA), an endpoint device, a web appliance, or any other machine capable of executing a set of instructions (sequential or otherwise) that specify actions to be taken by that machine. In a particular embodiment, the computer system 500 may be implemented using electronic devices that provide video, audio, or data communication. Further, while a single computer system 500 is illustrated, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. For example, when the computer system 500 corresponds to a media device, the processor 502 may include or correspond to the processor 104 of the media device 102 illustrated in FIGS. 1-3. As another example, when the computer system 500 corresponds to a server, the processor 502 may include or correspond to processor(s) of the server(s) 126 illustrated in FIGS. 1-3. Moreover, the computer system 500 may include a main memory 504 and a static memory 506, which can communicate with each other via a bus 508. For example, when the computer system 500 corresponds to a media device, the main memory 504 may include or correspond to the memory 106 of the media device 102 illustrated in FIG. 1-3. As another example, when the computer system 500 corresponds to a server, the main memory 504 may include or correspond to a memory of the server(s) 126 illustrated in FIGS. 1-3. As shown, the computer system 500 may further include a video display unit 510, such as a liquid crystal display (LCD), a light emitting diode (LED) display, a touch screen display, a flat panel display, or a solid state display. Additionally, the computer system 500 may include an input device 512, such as a remote control device or a keyboard, and a cursor control device 514, such as a mouse. In some embodiments, the input device 512 and the cursor control device 514 may be integrated into a single device, such as a capacitive touch screen input device. The computer system 500 may also include a signal generation device 518, such as a speaker, and a network interface device 520. Some computer systems 500 may not include an input device (e.g., a server may not include an input device). To illustrate, when the computer system 500 corresponds to the server(s) 126 illustrated in FIGS. 1-3, the computer system 500 not include an input device.

In a particular embodiment, as depicted in FIG. 5, the device 500 may include computer-readable storage 522 in which one or more sets of instructions 524, e.g. software, can be embedded. The computer-readable storage 522 may be random access memory (RAM), read-only memory (ROM), programmable read-only memory (PROM), erasable PROM (EPROM), electrically erasable PROM (EEPROM), register(s), solid-state memory, hard disk, a removable disk, a compact disc read-only memory (CD-ROM), other optical disk storage, magnetic disk storage, magnetic storage devices, or any other storage device that can be used to store program code in the form of instructions or data and that can be accessed by a computer and/or a processor. Computer-readable storage is not a signal. Further, the instructions 524 may embody one or more of the methods or logic as described herein.

When the device 500 corresponds to a media device (e.g., the media device 102 of FIGS. 1-3), FIG. 5 illustrates that the instructions 524 may include instructions 526 corresponding to an overlay application (e.g., the overlay application 108), instructions 528 corresponding to a media playback application (e.g., the media playback application 110), and (optionally) instructions 530 corresponding to a manifest merge application (e.g., the manifest merge application 132). The instructions 524 may be executable by the processor 502 to perform one or more functions or methods described herein, such as the method 400 described with reference to FIG. 4. In a particular embodiment, the instructions 524 may reside completely, or at least partially, within the main memory 504, the static memory 506, and/or within the processor 502 during execution by the computer system 500. The main memory 504 and the processor 502 also may include a computer-readable storage device.

FIG. 5 illustrates a particular embodiment in which the computer system 500 may correspond to a server, and the computer-readable storage 522 may include data. For example, the data may include manifest data 532 (e.g., a video stream manifest 534 and/or an advertisement stream manifest 536). In a particular embodiment, the video stream manifest 532 and the advertisement stream manifest 534 may correspond to the video stream manifest 140 and the advertisement stream manifest 142 illustrated in FIGS. 1 and 2, respectively. The video stream manifest 532 and the advertisement stream manifest 534 may be used to generate the manifest 114 illustrated in FIGS. 1 and 2.

In an alternative embodiment, dedicated hardware implementations, such as application specific integrated circuits, programmable logic arrays and other hardware devices, may be constructed to implement one or more of the methods described herein. Various embodiments may include a variety of electronic and computer systems. One or more embodiments described herein may implement functions using two or more specific interconnected hardware modules or devices with related control and data signals that can be communicated between and through the modules, or as portions of an application-specific integrated circuit (ASIC). Accordingly, the present system encompasses software, firmware, and hardware implementations.

In accordance with various embodiments of the present disclosure, the methods described herein may be implemented by software programs executable by a computer system, a processor, or a device, which may include forms of instructions embodied as a state machine implemented with logic components in an ASIC or a field programmable gate array (FPGA) device. Further, in an exemplary, non-limiting embodiment, implementations may include distributed processing, component/object distributed processing, and parallel processing. Alternatively, virtual computer system processing may be constructed to implement one or more of the methods or functionality as described herein. It is further noted that a computing device, such as a processor, a controller, a state machine or other suitable device for executing instructions to perform operations may perform such operations directly or indirectly by way of one or more intermediate devices directed by the computing device.

The present disclosure includes computer-readable storage 522 that stores instructions 524, so that a device connected to a network 538 may communicate voice, video or data over the network 538. While the computer-readable storage 522 is shown to be a single device, the computer-readable storage 522 may include a single device or multiple devices, such as a centralized or distributed database, and/or associated caches and servers that store one or more sets of instructions. The computer-readable storage 522 is capable of storing a set of instructions for execution by a processor to cause a computer system to perform any one or more of the methods or operations disclosed herein. For example, the computer-readable storage 522 may store instructions for execution by a processor to cause a computer system to perform the method 400 described with reference to FIG. 4.

In a particular non-limiting, exemplary embodiment, the computer-readable storage 522 may include a solid-state memory such as embedded memory (or a memory card or other package that houses one or more non-volatile read-only memories). Further, the computer-readable storage 522 may be a random access memory or other volatile re-writable memory. Additionally, the computer-readable storage 522 may include a magneto-optical or optical device, such as a disk or tapes or other storage device. Accordingly, the disclosure is considered to include any one or more of a computer-readable storage device and other equivalents and successor devices, in which data or instructions may be stored.

Although the one or more components and functions may be described herein as being implemented with reference to particular standards or protocols, the disclosure is not limited to such standards and protocols. Such standards are from time-to-time superseded by faster or more efficient equivalents having essentially the same functions. Wireless standards for device detection, short-range communications, and long-range communications can be used by the computer system 500 in selected embodiments.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Figures are also merely representational and may not be drawn to scale. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order unless expressly stated. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be implemented as multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines (e.g., virtual servers), components such as microprocessors and storage devices may be virtualized or logically represented. The processor can include a state machine, an application specific integrated circuit, and/or a programmable gate array (PGA) including a FPGA. In one or more embodiments, when a processor executes instructions to perform "operations", this can include the processor performing the operations directly and/or facilitating, directing, or cooperating with another device or component to perform the operations.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A media device comprising:
    a processor;
    a memory accessible to the processor, the memory storing instructions corresponding to an overlay application and a media playback application, wherein the instructions are executable to cause the processor to:
        generate a manifest based on a media content manifest, an advertisement manifest, and trigger information associated with an advertisement identified in the advertisement manifest, wherein the manifest identifies locations of media content files, locations of advertisement content files, and a trigger based on the trigger information, and wherein the trigger enables interactive content to overlay the advertisement;
        obtain media content identified in the manifest;
        use the media playback application to generate a display that includes the media content; and
        in response to reaching the trigger in the manifest:
            retrieve the overlay application from the memory; and
            execute the overlay application to allocate a portion of the display to the interactive content.

2. The media device of claim 1, wherein the manifest identifies:
    a plurality of video files associated with a video stream and a first set of network locations associated with the video files;
    a plurality of advertisement files associated with an advertisement stream and a second set of network locations associated with the advertisement files; and
    a sequence in which individual video files of the plurality of video files and individual advertisement files of the plurality of advertisement files are to be displayed.

3. The media device of claim 2, wherein:
    the first set of network locations associated with the video files includes a first set of uniform resource locators, wherein the media playback application generates requests to retrieve the video files based on the first set of uniform resource locators in accordance with a hypertext markup language version 5 protocol and based on the sequence identified in the manifest; and
    the second set of network locations associated with the advertisement files includes a second set of uniform resource locators, wherein the media playback application generates requests to retrieve the advertisement files based on the second set of uniform resource locators in accordance with the hypertext markup language version 5 protocol and based on the sequence identified in the manifest.

4. The media device of claim 2, wherein the interactive content includes interactive advertisement content.

5. The media device of claim 4, wherein the overlay application retrieves the interactive advertisement content responsive to the trigger.

6. The media device of claim 5, wherein the overlay application retrieves the interactive advertisement content from a server based on a network address identified in the manifest.

7. The media device of claim 5, wherein the instructions are further executable to cause the processor to:
    receive the interactive advertisement content; and
    store the interactive advertisement content in the memory, wherein the overlay application retrieves the interactive advertisement content from the memory responsive to the trigger.

8. The media device of claim 4, wherein the media device displays the interactive advertisement content via a web browser.

9. The media device of claim 1, wherein the trigger identifies interactive content to be displayed in conjunction with a particular file, wherein the particular file is retrievable from a server based on a network address identified in the manifest.

10. The media device of claim 9, wherein the interactive content includes a prompt to be displayed in the portion of the display, wherein the prompt includes a plurality of user selectable options, and wherein the media device sends information to the server that identifies a particular selected option.

11. The media device of claim 10, wherein the interactive content includes an event capture object, wherein the event capture object identifies particular information to be sent to the server responsive to selection of each of the plurality of user selectable options.

12. A computer-readable storage device storing instructions corresponding to an overlay application and a media playback application, wherein the instructions are executable to cause a processor of a device to perform operations including:
    generating a manifest based on a media content manifest for a media content item, an advertisement manifest, and trigger information associated with an advertisement identified in the advertisement manifest, wherein the manifest identifies locations of media content files, locations of advertisement content files, and a trigger based on the trigger information, and wherein the trigger enables interactive content to overlay the advertisement;
    obtaining media content identified in the manifest, wherein the manifest identifies a plurality of files associated with the media content item and a sequence in which individual files of the plurality of files are to be displayed;

using the media playback application to generate a display that includes the media content;

in response to reaching the trigger in the manifest using the overlay application to retrieve the interactive content that is to be displayed in conjunction with the advertisement; and using the overlay application to allocate a portion of the display to the interactive content.

13. The computer-readable storage device of claim 12, wherein the overlay application retrieves interactive advertisement content that is displayed in the portion of the display in conjunction with the particular advertisement.

14. The computer-readable storage device of claim 13, wherein the overlay application overlays the interactive advertisement content onto the advertisement.

15. The computer-readable storage device of claim 14, wherein the overlay application overlays the interactive advertisement content onto the advertisement for display via a web browser.

16. A method comprising:

generating, at a media device, a manifest based on a media content manifest, an advertisement manifest, and trigger information associated with an advertisement identified in the advertisement manifest, wherein the manifest identifies locations of media content files, locations of advertisement content files, a trigger based on the trigger information, and a sequence in which the media content files and the advertisement content files are to be displayed, and wherein the trigger enables interactive content to overlay the advertisement;

retrieving instructions corresponding to a media playback application from a memory of the media device;

using the media playback application to generate a display that includes media content identified in the manifest;

in response to reaching the trigger in the manifest, retrieving interactive advertisement content associated with the advertisement;

retrieving instructions corresponding to an overlay application from the memory of the media device; and using the overlay application to overlay the interactive advertisement content onto the advertisement.

17. The method of claim 16, further comprising:

capturing an event associated with interaction with the interactive advertisement content; and determining additional information associated with the advertisement that is to be displayed responsive to the event.

18. The method of claim 16, further comprising:

retrieving a particular video file identified in the manifest based on a particular uniform resource locator associated with the particular video file in accordance with a hypertext markup language version 5 protocol and based on the sequence identified in the manifest; and retrieving a particular advertisement file based on a particular uniform resource locator associated with the particular advertisement file in accordance with the hypertext markup language version 5 protocol and based on the sequence identified in the manifest.

19. The method of claim 16, further comprising:

receiving user input requesting a media content item; and sending a manifest request for the media content manifest in response to the user input, wherein the media content manifest corresponds to the media content item, and wherein the media content manifest is received in response to the manifest request.

20. The method of claim 19, wherein the advertisement manifest is received and stored in the memory of the media device prior to receipt of the user input.

* * * * *